US012693455B2

(12) United States Patent      (10) Patent No.:   US 12,693,455 B2

Kim et al.      (45) Date of Patent:     Jul. 28, 2026

(54) DISPLAY DEVICE AND METHOD OF MANUFACTURING THE SAME

(71) Applicant: Samsung Display Co., Ltd., Yongin-si (KR)

(72) Inventors: Youngdo Kim, Suwon-si (KR); Junehyoung Park, Seoul (KR); Junwoo You, Seongnam-si (KR); Changmoo Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 650 days.

(21) Appl. No.: 18/094,693

(22) Filed: Jan. 9, 2023

(65) Prior Publication Data

US 2023/0280507 A1     Sep. 7, 2023

(30) Foreign Application Priority Data

Mar. 2, 2022    (KR) ........................ 10-2022-0026796

(51) Int. Cl.
| | |
|---|---|
| *G02B 5/00* | (2006.01) |
| *B32B 17/06* | (2006.01) |
| *B32B 17/10* | (2006.01) |
| *B32B 25/04* | (2006.01) |
| *B32B 25/08* | (2006.01) |

(Continued)

(52) U.S. Cl.
CPC ............ *G02B 5/003* (2013.01); *B32B 25/042* (2013.01); *B32B 25/08* (2013.01); *B32B 25/20* (2013.01); *B32B 27/08* (2013.01); *B32B 27/20* (2013.01); *B32B 27/308* (2013.01); *B32B 27/38* (2013.01); *B32B 17/063* (2013.01); *B32B 17/10* (2013.01); *B32B 2255/10* (2013.01);

(Continued)

(58) Field of Classification Search
CPC ....... B32B 25/042; B32B 25/08; B32B 25/20; B32B 27/08; B32B 27/308; B32B 27/38; B32B 17/063; B32B 17/10; B32B 2255/10; B32B 27/20; G02B 5/003; H10K 50/865
See application file for complete search history.

(56) References Cited

U.S. PATENT DOCUMENTS

| | | |
|---|---|---|
| 5,300,558 A | 4/1994 | Kurisu et al. |
| 2015/0056382 A1 | 2/2015 | Suganuma et al. |

(Continued)

FOREIGN PATENT DOCUMENTS

| | | |
|---|---|---|
| CN | 113365819 A | 9/2021 |
| KR | 100271677 B1 | 11/2000 |

(Continued)

OTHER PUBLICATIONS

Office Action mailed Sep. 15, 2025 in KR Patent Application No. 10-2022-0026796, 15 pages, w/English-language translation.

*Primary Examiner* — Thomas K Pham
*Assistant Examiner* — Ruby L Kauffman
(74) *Attorney, Agent, or Firm* — CANTOR COLBURN LLP

(57) ABSTRACT

A display device includes a display panel including a base substrate and a plurality of pixels disposed on the base substrate, a light blocking cushion layer disposed under the display panel, wherein the light blocking cushion layer directly contacts the base substrate, and a metal layer disposed under the light blocking cushion layer, wherein the metal layer directly contacts the light blocking cushion layer.

20 Claims, 6 Drawing Sheets

(51) Int. Cl.

| | | |
|---|---|---|
| *B32B 25/20* | (2006.01) | |
| *B32B 27/08* | (2006.01) | |
| *B32B 27/20* | (2006.01) | |
| *B32B 27/30* | (2006.01) | |
| *B32B 27/38* | (2006.01) | |

(52) U.S. Cl.
CPC ... *B32B 2255/205* (2013.01); *B32B 2307/732* (2013.01); *B32B 2457/20* (2013.01)

(56) References Cited

U.S. PATENT DOCUMENTS

| | | | | |
|---|---|---|---|---|
| 2015/0282336 A1* | 10/2015 | Jung | .......................... | B32B 7/12 |
| | | | | 361/679.01 |
| 2019/0344538 A1* | 11/2019 | Meyer | ................... | B32B 27/308 |
| 2020/0235075 A1* | 7/2020 | Tsai | ..................... | G02B 5/0294 |
| 2021/0212197 A1* | 7/2021 | Watanabe | ............. | B32B 15/098 |
| 2022/0020956 A1 | 1/2022 | Kim | | |
| 2022/0195251 A1* | 6/2022 | Oh | ............................. | C09J 7/29 |

FOREIGN PATENT DOCUMENTS

| | | | |
|---|---|---|---|
| KR | 1020050028133 A | 3/2005 |
| KR | 100888048 B1 | 3/2009 |
| KR | 1020150004355 A | 1/2015 |
| KR | 1020170050722 A | 5/2017 |
| KR | 1020200023574 A | 3/2020 |
| KR | 1020200083775 A | 7/2020 |
| KR | 102154522 B1 | 9/2020 |
| KR | 1020200120996 A | 10/2020 |
| KR | 102203780 B1 | 1/2021 |

* cited by examiner

DISPLAY DEVICE AND METHOD OF MANUFACTURING THE SAME

This application claims priority to Korean Patent Application No. 10-2022-0026796, filed on Mar. 2, 2022, and all the benefits accruing therefrom under 35 U.S.C. § 119, the content of which in its entirety is herein incorporated by reference.

BACKGROUND

Field

Implementations of the invention relate generally to a display device and a method of manufacturing the display device.

The Background

A display device may include a display panel displaying an image and a plurality of functional layers disposed under the display panel. The plurality of functional layers may include, for example, a cushion layer for protecting the display panel from shock or impact, a light blocking layer for blocking external light, an electromagnetic wave shielding layer for blocking electromagnetic waves, a heat dissipation layer for dissipating heat emitted from the display panel, etc.

Generally, in a method of manufacturing the display device, after the display panel and the plurality of functional layers are separately manufactured, the plurality of functional layers may be attached to the display panel. For example, the display panel and the plurality of functional layers may be adhered to each other by an adhesive layer. In this case, since impurities is inserted between the display panel and the plurality of functional layers, display efficiency of the display device may be reduced, and efficiency of manufacturing process of the display device may be reduced.

SUMMARY

Embodiments provide a foldable display device displaying an image.

A display device according to an embodiment includes: a display panel including a base substrate and a plurality of pixels disposed on the base substrate; a light blocking cushion layer disposed under the display panel, where the light blocking cushion layer directly contacts the base substrate; and a metal layer disposed under the light blocking cushion layer, where the metal layer directly contacts the light blocking cushion layer.

In an embodiment, the light blocking cushion layer may include a light blocking pigment and at least one of urethane acrylate, silicone, and epoxy.

In an embodiment, the light blocking pigment may include carbon.

In an embodiment, a thickness of the light blocking cushion layer may be equal to or more than about 50 micrometers and equal to or less than about 250 micrometers.

In an embodiment, light absorption rate of the light blocking cushion layer may be about 99.9% or more.

In an embodiment, the metal layer may include copper.

In an embodiment, a thickness of the metal layer may be equal to or more than about 10 micrometers and equal to or less than about 50 micrometers.

In an embodiment, the light blocking cushion layer may include: a light blocking layer disposed under the display panel, wherein the light blocking layer directly contacts the base substrate, and a cushion layer disposed under the light blocking layer, wherein the cushion layer directly contacts each of the light blocking layer and the metal layer.

In an embodiment, a thickness of the light blocking layer may be equal to or more than about 10 micrometers and equal to or more than about 30 micrometers.

A method of manufacturing a display device according to an embodiment includes: forming a display panel including a base substrate and a plurality of pixels disposed on the base substrate; forming a light blocking cushion layer by applying a resin including an elastic polymer and a light blocking pigment on a lower surface of the base substrate; and forming a metal layer by coating metal particles on a lower surface of the light blocking cushion layer.

In an embodiment, the forming of the light blocking cushion layer may further include curing the resin by applying heat of equal to or more than about 50 Celsius and equal to or more than about 80 Celsius.

In an embodiment, the forming of the light blocking cushion layer may further include: curing the resin by irradiating the resin with ultraviolet (UV) light and then drying the resin naturally.

In an embodiment, the resin may further include a curing agent.

In an embodiment, the forming of the metal layer may include injecting a plasma gas including the metal particles toward the lower surface of the light blocking cushion layer.

In an embodiment, the forming of the metal layer may include: applying ink including the metal particles and a solvent on the lower surface of the light blocking cushion layer, evaporating the solvent by applying heat of equal to or more than about 40 Celsius and equal to or less than about 80 Celsius to the ink, and sintering the metal particles by irradiating the ink with light.

A method of manufacturing a display device according to another embodiment includes: forming a display panel including a base substrate and a plurality of pixels disposed on the base substrate; forming a light blocking layer by applying a first resin including a light blocking pigment on a lower surface of the base substrate; forming a cushion layer by applying a second resin including an elastic polymer on a lower surface of the light blocking layer; and forming a metal layer by coating metal particles on a lower surface of the cushion layer.

In an embodiment, the forming of the light blocking layer may further include curing the first resin by irradiating the first resin with UV light.

In an embodiment, a thickness of the light blocking layer may be equal to or more than about 10 micrometers and equal to or less than about 30 micrometers.

In an embodiment, the forming of the metal layer may include injecting a plasma gas including the metal particles toward the lower surface of the cushion layer.

In an embodiment, the forming of the metal layer may include applying ink including the metal particles and a solvent on the lower surface of the cushion layer, evaporating the solvent by applying heat of equal to or more than about 40 Celsius and equal to or less than about 80 Celsius to the ink, and sintering the metal particles by irradiating the ink with light.

A display device according to embodiments may include a light blocking cushion layer which directly contacts a base substrate, and a metal layer which directly contacts the light blocking cushion layer. In this case, adhesive layer does not exist between the base substrate and the light blocking cushion layer, and between the light blocking cushion layer and the metal layer. Accordingly, defect of the display device due to impurities may not occur.

A method of manufacturing a display device according to an embodiment may include forming a display panel including a base substrate, forming a light blocking cushion layer by applying a resin including an elastic polymer and a light blocking pigment on a lower surface of the base substrate, and forming a metal layer by coating metal particles on a lower surface of the light blocking cushion layer. Accordingly, compared to a process of attaching a separately manufactured light blocking cushion layer to the display panel or attaching separately manufactured metal layer to the light blocking cushion layer, efficiency of manufacturing process of the display device may be effectively improved.

A method of manufacturing a display device according to another embodiment may include forming a display panel including a base substrate, forming a light blocking layer by applying a first resin including a light blocking pigment on a lower surface of the base substrate, forming a cushion layer by applying a second resin including an elastic polymer on a lower surface of the light blocking layer, and forming a metal layer by coating metal particles on a lower surface of the light blocking cushion layer. Accordingly, compared to a process of attaching a separately manufactured light blocking layer to the display panel, attaching separately manufactured cushion layer to the light blocking layer, or attaching separately manufactured metal layer to the cushion layer, efficiency of manufacturing process of the display device may be effectively improved.

BRIEF DESCRIPTION OF THE DRAWINGS

The accompanying drawings, which are included to provide a further understanding of the invention and are incorporated in and constitute a part of this specification, illustrate embodiments of the invention together with the description.

DETAILED DESCRIPTION

Figure 1:
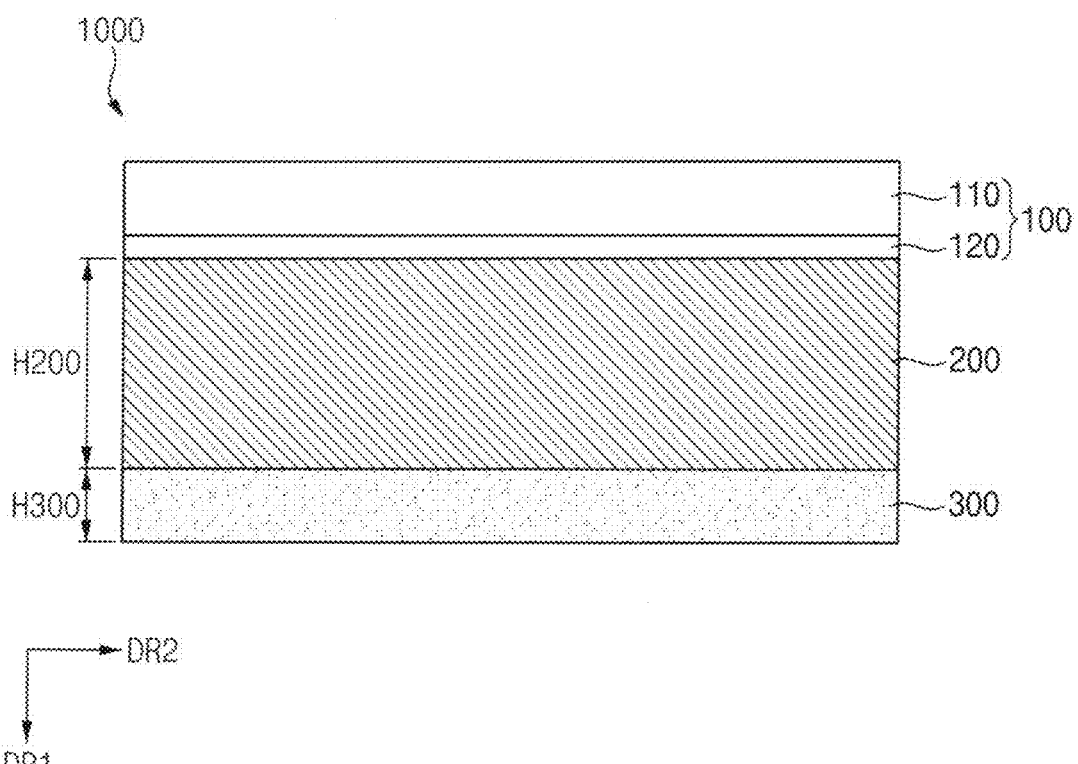
FIG. 1 is a cross-sectional view illustrating a display device according to an embodiment.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Illustrative, non-limiting embodiments will be more clearly understood from the following detailed description in conjunction with the accompanying drawings.

FIG. 1 is a cross-sectional view illustrating a display device according to an embodiment.

Referring to FIG. 1, a display device 1000 may include a display panel 100, a light blocking cushion layer 200, and a metal layer 300. The display panel 100 may include a pixel layer 110 and a base substrate 120. The pixel layer 110, the base substrate 120, the light blocking cushion layer 200, and the metal layer 300 may be sequentially stacked in a first direction DR1.

The pixel layer 110 may include a plurality of pixels and a driving element. The driving element may generate electrical signals, and each of the plurality of pixels may receive the electrical signals and may emit light having a luminance corresponding to intensity of the electrical signals.

The base substrate 120 may be disposed under the pixel layer 110. The base substrate 120 may support the pixel layer 110. In an embodiment, the base substrate 120 may have flexibility to be repeatedly folded and unfolded. For example, the base substrate 120 may include glass having flexibility, plastic, etc.

The light blocking cushion layer 200 may be disposed under the base substrate 120. The light blocking cushion layer 200 may directly contact a lower surface of the base substrate 120. The light blocking cushion layer 200 may include a polymer material having a relatively high elasticity and a light blocking pigment having a relatively low light transmittance. For example, the polymer material may include at least one of urethane acrylate, silicone, and epoxy. For example, the light blocking pigment may include carbon. Specifically, the light blocking pigment may include graphene, carbon black, carbon nanotube, etc.

Since the light blocking cushion layer 200 includes the polymer material having a relatively high elasticity, the light blocking cushion layer 200 may protect the display panel 100 from shock or impact. In addition, since the light blocking cushion layer 200 includes the light blocking pigment, the light blocking cushion layer 200 may prevent external light incident from a lower surface of the light blocking cushion layer 200 in the first direction DR1 from being recognized by user of the display device 1000. In this case, in an embodiment, light absorption rate of the light blocking cushion layer 200 may be about 99.9 percentages (%) or more. In other words, the light blocking cushion layer 200 may transmit only about 0.1% or less of the external light.

The metal layer 300 may be disposed under the light blocking cushion layer 200. The metal layer 300 may directly contact the lower surface of the light blocking cushion layer 200. The metal layer 300 may include metal. For example, the metal layer 300 may include copper. Accordingly, the metal layer 300 may evenly distribute heat emitted from a portion of the display panel 100. In addition, the metal layer 300 may shield electromagnetic waves.

In an embodiment, a thickness H200 of the light blocking cushion layer 200 may be equal to or more than about 50 micrometers and equal to or less than about 250 micrometers in the first direction DR1. In addition, in an embodiment, a thickness H300 of the metal layer 300 may be equal to or more than about 10 micrometers or more and equal to or less than about 50 micrometers in the first direction DR1.

FIG. 2, FIG. 3, FIG. 4, FIG. 5, FIG. 6, and FIG. 7 are diagrams illustrating a method of manufacturing the display device of FIG. 1.

Figure 2:
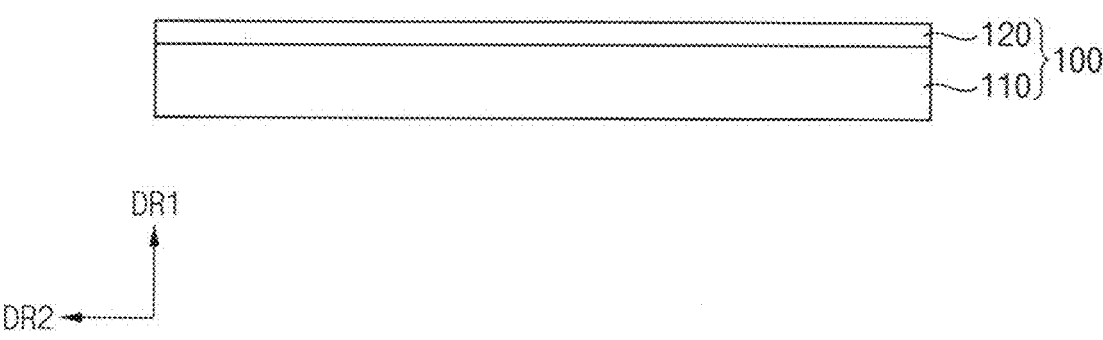
FIG. 2, FIG. 3, FIG. 4, FIG. 5, FIG. 6, and FIG. 7 are diagrams illustrating a method of manufacturing the display device of FIG. 1.

FIG. 2 is a cross-sectional view illustrating the display panel 100 of FIG. 1.

Referring to FIG. 2, the display panel 100 may be formed. There is no limitation on a method of forming the display panel 100, and various known methods may be used.

Figure 3:
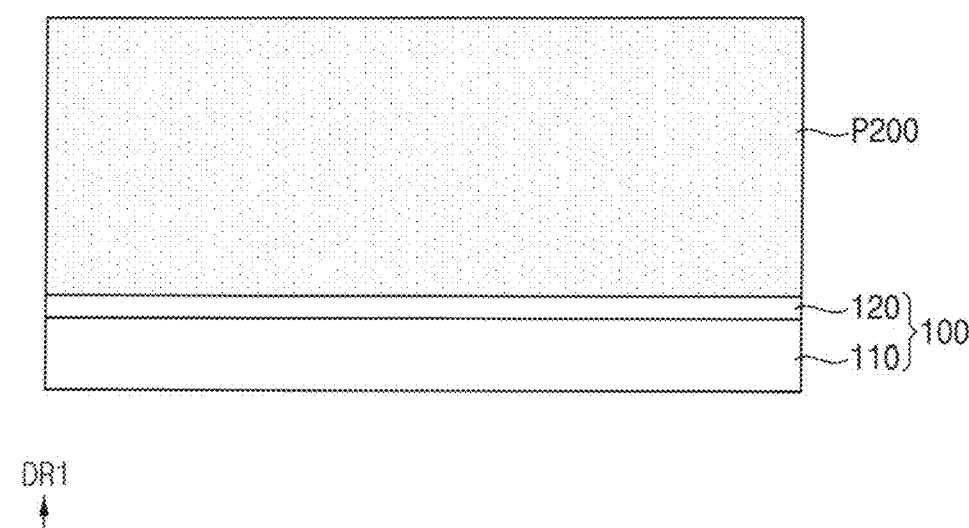
Figure 4:
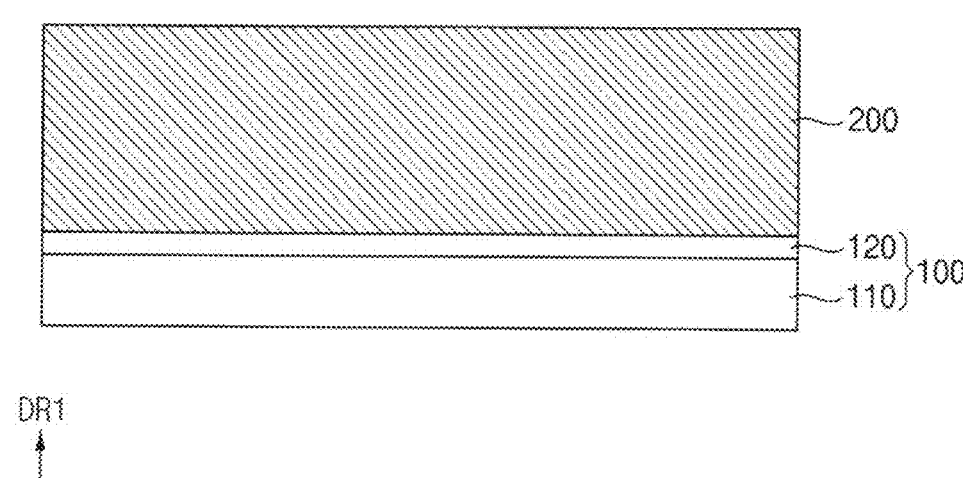

FIG. 3 and FIG. 4 are cross-sectional views illustrating a method of forming the light blocking cushion layer 200 in FIG. 1.

Referring to FIG. 3, a pre-light blocking cushion layer P200 may be formed by applying a resin on a lower surface of the base substrate 120.

The resin may include an elastic polymer and a light blocking pigment. The elastic polymer may be a polymer material having a relatively high elasticity. For example, the polymer material may include at least one of urethane acrylate, silicone, and epoxy. The light blocking pigment may include carbon. For example, the light blocking pigment may include graphene, carbon black, carbon nanotube, etc.

Referring to FIG. 4, the light blocking cushion layer 200 may be formed by curing the resin.

In an embodiment, the resin may be cured by applying heat of equal to or more than about 50 Celsius and equal to or less than about 80 Celsius to the resin. When the heat applied to the resin is less than about 50 Celsius, the resin may not be cured, and accordingly, the resin may be separated from the base substrate 120. When the heat applied to the resin exceeds about 80 Celsius, the display panel 100 may be damaged by the heat.

In another embodiment, after irradiating the resin with ultraviolet (UV) light, the resin may be naturally dried to cure the resin. In this case, heat may not be applied to the display panel 100, and accordingly, damage to the display panel 100 due to heat may be effectively prevented.

In still another embodiment, the resin may further include a curing agent. Accordingly, when a predetermined time elapses after the resin is applied, the resin may be cured.

Figure 5:
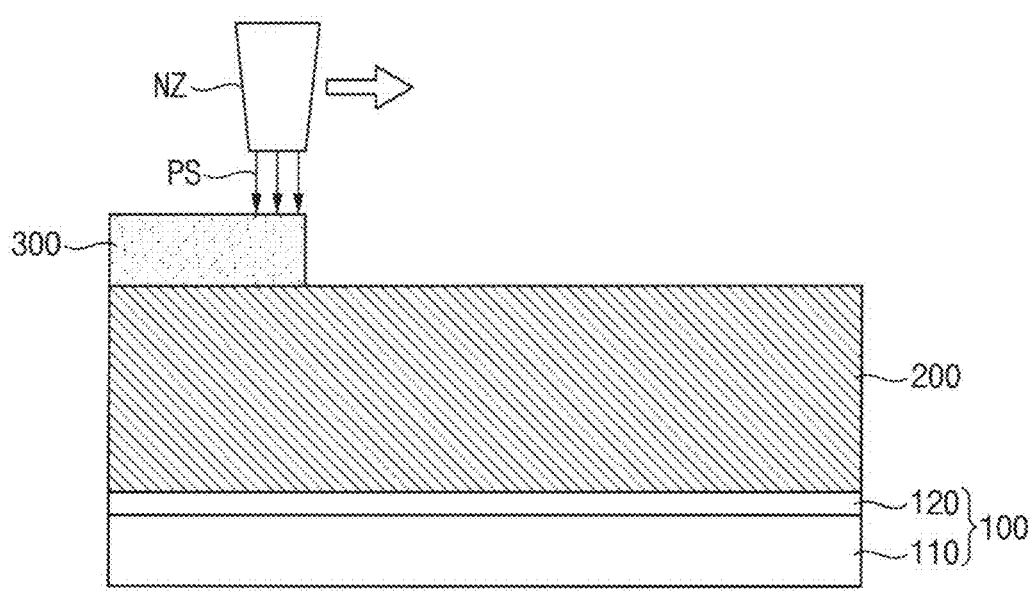
Figure 5:

FIG. 5 is a diagram illustrating an embodiment of a method of forming the metal layer 300 of FIG. 1.

Referring to FIG. 1 and FIG. 5, the metal layer 300 may be formed by coating metal particles on a lower surface of the light blocking cushion layer 200.

Specifically, gas and metal particles may be supplied to a nozzle NZ. The nozzle NZ may include an inner space having a relatively high temperature. In the inner space of the nozzle NZ, the gats may be turned into a plasma gas, and the metal particles may be melted by the plasma gas. The nozzle NZ may inject the plasma gas PS including the metal particles toward the lower surface of the light blocking cushion layer 200. The metal particles included in the plasma gas may aggregate on the lower surface of the light blocking cushion layer 200 to form the metal layer 300.

The nozzle NZ may be spaced apart from the lower surface of the light blocking cushion layer 200 by a predetermined distance, and accordingly, in an area adjacent to the lower surface of the light blocking cushion layer 200, temperature of the plasma gas may be relatively low. Accordingly, the light blocking cushion layer 200 may not be damaged by the heat.

Figure 6:
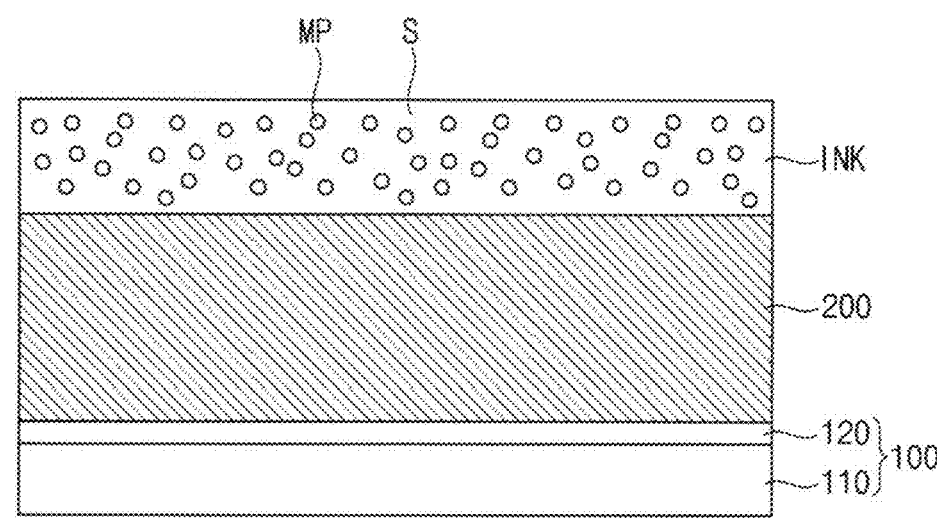
Figure 6:
Figure 7:
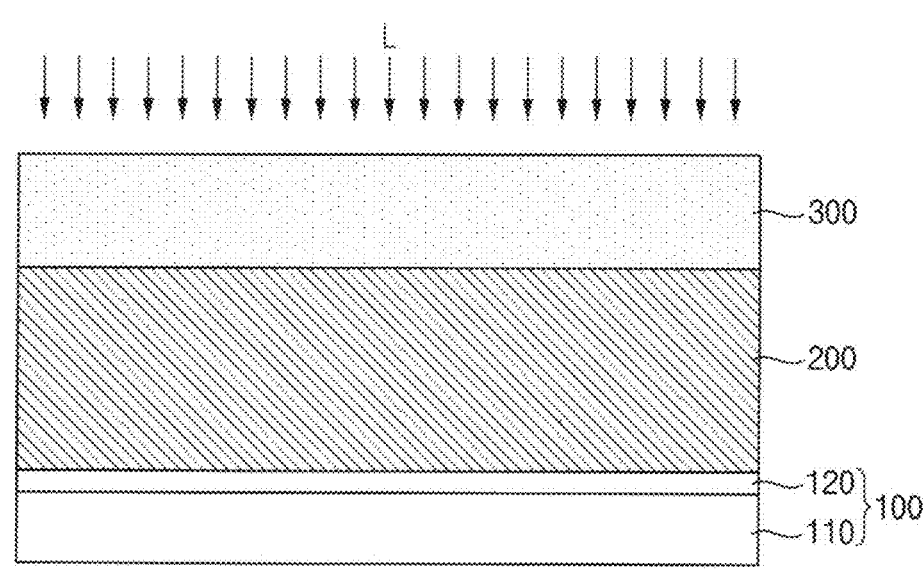
Figure 7:

FIG. 6 and FIG. 7 are diagrams illustrating another embodiment of a method of forming the metal layer 300 of FIG. 1.

Referring to FIG. 1, FIG. 6, and FIG. 7, the metal layer 300 may be formed by coating metal particles on a lower surface of the light blocking cushion layer 200.

Specifically, ink INK including metal particles MP and solvent S may be applied to the lower surface of the light blocking cushion layer 200. There is no limitation on a method of applying the ink INK, and various known methods may be used.

Heat of equal to or more than about 40 Celsius and equal to or less than about 80 Celsius may be applied to the ink INK. Accordingly, the solvent S may be evaporated. When the heat applied to the ink INK is less than about 40 Celsius, the solvent may not substantially evaporate. When the heat applied to the ink INK exceeds about 80 Celsius, the display panel 100 and the light blocking cushion layer 200 may be damaged by the heat.

After the solvent S is evaporated, light L may be irradiated to the ink INK. The light L may be irradiated for a relatively short time. As the light L is irradiated, the metal particles MP may be sintered. Accordingly, the metal layer 300 may be formed.

Figure 8:
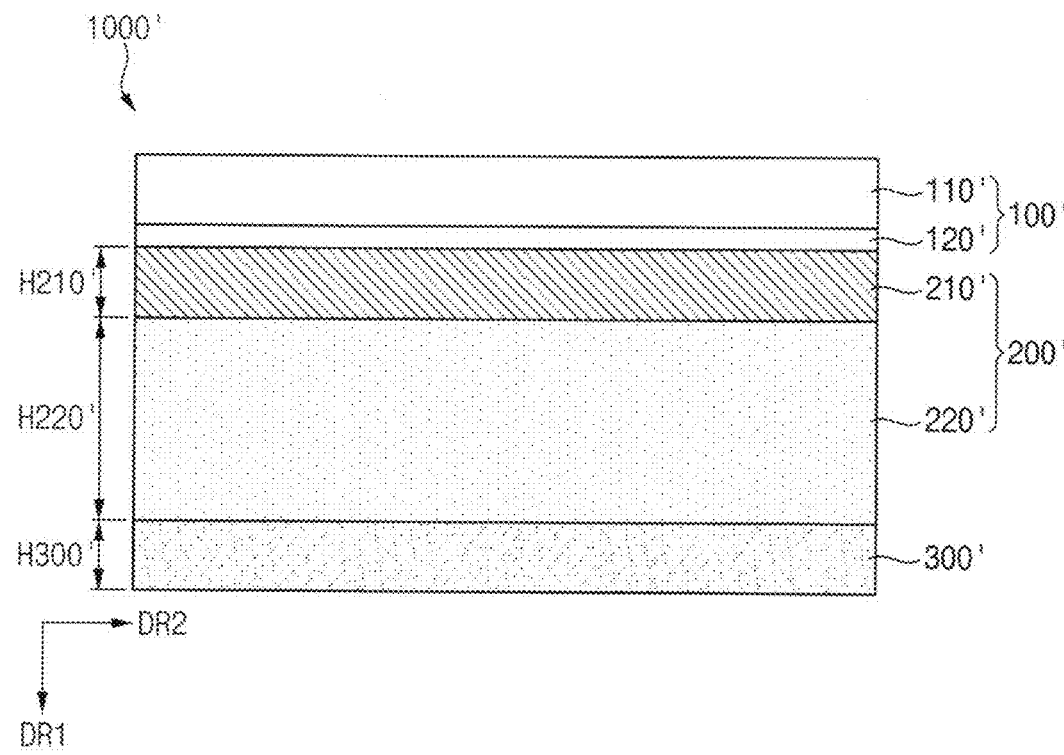
FIG. 8 is a cross-sectional view illustrating a display device according to another embodiment.

FIG. 8 is a cross-sectional view illustrating a display device according to another embodiment.

Referring to FIG. 8, a display device 1000' may include a display panel 100', a light blocking cushion layer 200', and a metal layer 300'. The display panel 100' may include a pixel layer 110' and a base substrate 120', and the light blocking cushion layer 200' may include a light blocking layer 210' and a cushion layer 220'. The pixel layer 110', the base substrate 120', the light blocking layer 210', the cushion layer 220', and the metal layer 300' may be sequentially stacked in the first direction DR1.

The pixel layer 110' may be substantially same as the pixel layer 110 described with reference to FIG. 1. For example, the pixel layer 110' may include the plurality of pixels and the driving element.

The base substrate 120' may be disposed under the pixel layer 110' The base substrate 120' may be substantially same as the base substrate 120 described with reference to FIG. 1. For example, the base substrate 120' may support the pixel layer 110'.

The light blocking layer 210' may be disposed under the base substrate 120'. The light blocking layer 210' may directly contact a lower surface of the base substrate 120'. The light blocking layer 210' may include a light blocking pigment having a relatively low light transmittance. For example, the light blocking pigment may include carbon. In an embodiment, the light blocking pigment may include graphene, carbon black, carbon nanotube, etc.

Since the light blocking layer 210 includes the light blocking pigment, the light blocking layer 210' may prevent external light incident from a lower surface of the light blocking layer 210' in the first direction DR1 from being recognized by user of the display device 1000'. In this case, in an embodiment, light absorption rate of the light blocking layer 210' may be about 99.9% or more. In other words, the light blocking layer 210' may transmit only about 0.1% or less of the external light.

The cushion layer 220' may be disposed under the light blocking layer 210'. The cushion layer 220' may directly contact the lower surface of the light blocking layer 210'. The cushion layer 220' may include a polymer material having a relatively high elasticity. For example, the polymer material may include at least one of urethane acrylate, silicone, and epoxy.

Since the cushion layer 220' includes the polymer material having a relatively high elasticity, the cushion layer 220' may protect the display panel 100' from shock or impact.

The metal layer 300' may be disposed under the cushion layer 220'. The metal layer 300' may directly contact a lower surface of the cushion layer 220'. The metal layer 300' may be substantially same as the metal layer 300 described with reference to FIG. 1. For example, the metal layer 300' may evenly distribute heat emitted from a portion of the display panel 100'. In addition, the metal layer 300' may shield electromagnetic waves.

In an embodiment, a thickness H210' of the light blocking layer 210' may be equal to or more than about 10 micrometers and equal to or less than about 30 micrometers. In addition, in an embodiment, a thickness H220' of the cushion layer 220' may be equal to or more than about 20 micrometers and equal to or less than about 240 micrometers, and a thickness H300' of the metal layer 300' may be equal to or more than about 10 micrometers and equal to or less than about 50 micrometers.

Figure 9:
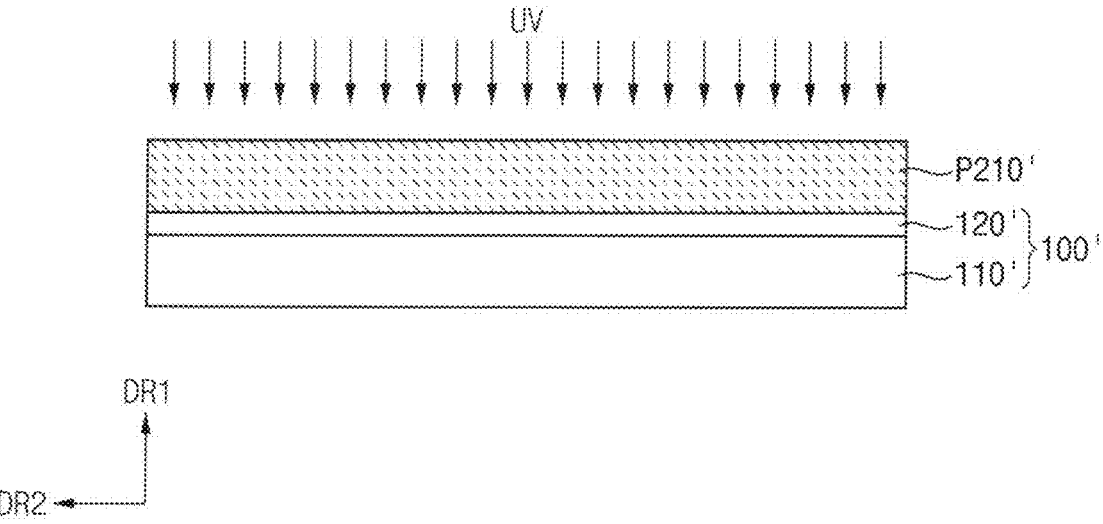
FIG. 9, FIG. 10, and FIG. 11 are diagrams illustrating a method of manufacturing the display device of FIG. 8.
Figure 10:
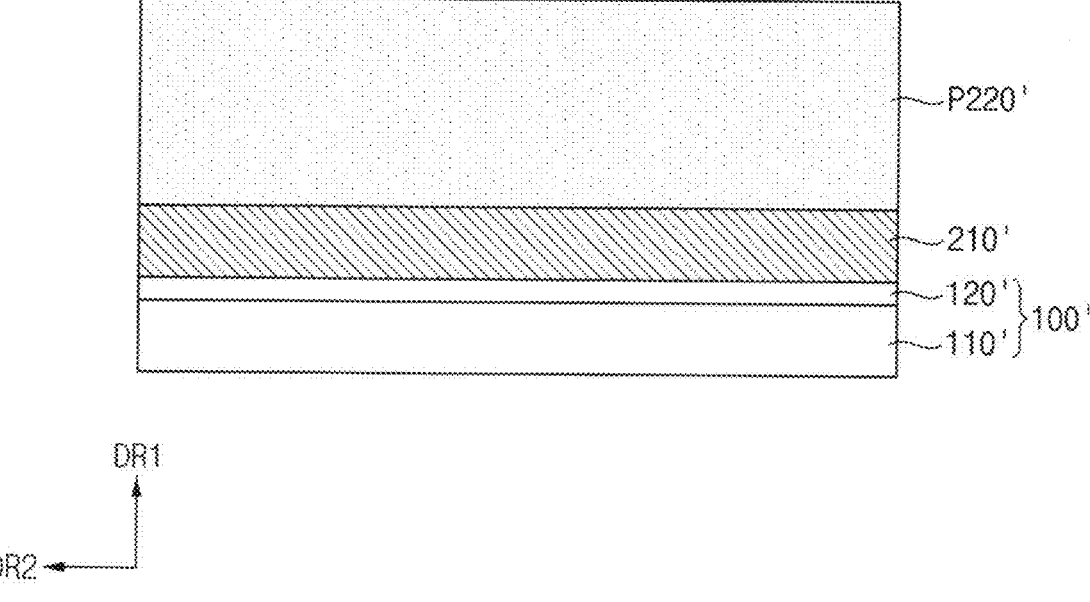
Figure 11:
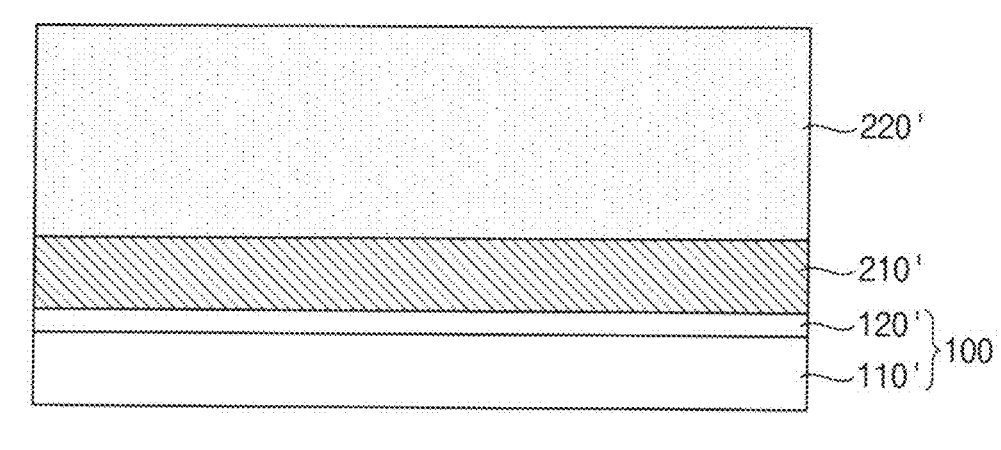
Figure 11:

FIG. 9, FIG. 10, and FIG. 11 are diagrams illustrating a method of manufacturing the display device of FIG. 8.

FIG. 9 is a diagram illustrating a method of forming the light blocking layer 210' of FIG. 8.

Referring to FIG. 8, after forming the display panel 100', a pre-light blocking layer P210' may be formed by applying a first resin. The first resin may include a light blocking pigment. The light blocking pigment may include carbon. For example, the light blocking pigment may include graphene, carbon black, carbon nanotube, etc.

In an embodiment, UV light UV may be irradiated to the first resin. Accordingly, the first resin may be cured to form the light blocking layer 210'. In this case, the thickness H210' of the light blocking layer 210' may be equal to or more than about 10 micrometers and equal to or less than about 30 micrometers. When the thickness H210' of the light blocking layer 210' is less than about 10 micrometers, light blocking efficiency of the light blocking layer 210' may be relatively low. When the thickness H210' of the light blocking layer 210' is greater than about 30 micrometers, UV light UV may be blocked by the light blocking pigment included in the first resin, and the light blocking layer 210' adjacent to the base substrate 120' may not be substantially cured. Accordingly, the light blocking layer 210' may be separated from the base substrate 120'.

FIG. 10 and FIG. 11 are diagrams illustrating a method of forming the cushion layer 220' of FIG. 8.

Referring to FIG. 10, a pre-cushion layer P220' may be formed by applying a second resin on the lower surface of the light blocking layer 210'.

The second resin may include an elastic polymer. The elastic polymer may be a polymer material having a relatively high elasticity. For example, the polymer material may include at least one of urethane acrylate, silicone, and epoxy.

Referring to FIG. 11, the cushion layer 220' may be formed by curing the second resin.

In an embodiment, the second resin may be cured by applying heat of equal to or more than about 50 Celsius and equal to or less than about 80 Celsius to the resin. When the heat applied to the second resin is less than about 50 Celsius, the second resin may not be cured, and accordingly, the second resin may be separated from the base substrate 120. When the heat applied to the second resin exceeds about 80 Celsius, the display panel 100 may be damaged by the heat.

In another embodiment, after irradiating the second resin with UV light, the second resin may be naturally dried to cure the second resin. In this case, heat may not be applied to the display panel 100, and accordingly, damage to the display panel 100 due to heat may be effectively prevented.

In still another embodiment, the second resin may further include a curing agent. Accordingly, when a predetermined time elapses after the second resin is applied, the second resin may be cured.

After forming the cushion layer 220', the metal layer 300' may be formed by coating metal particles on a lower surface of the cushion layer 220'. Forming the metal layer 300' on the lower surface of the cushion layer 220' may be substantially same as forming the metal layer 300 on the lower surface of the light blocking cushion layer 200 described with reference to FIG. 5, FIG. 6, and FIG. 7.

Although certain embodiments and implementations have been described herein, other embodiments and modifications will be apparent from this description. Accordingly, the inventions are not limited to such embodiments, but rather to the broader scope of the appended claims and various obvious modifications and equivalent arrangements as would be apparent to a person of ordinary skill in the art.

What is claimed is:

1. A display device comprising:
    a display panel comprising a base substrate and a plurality of pixels disposed on the base substrate;
    a light blocking cushion layer disposed under the display panel, wherein the light blocking cushion layer directly contacts the base substrate; and
    a metal layer disposed under the light blocking cushion layer, wherein the metal layer directly contacts the light blocking cushion layer,
    wherein adhesive layer does not exist between the base substrate and the light blocking cushion layer, and between the light blocking cushion layer and the metal layer.

2. The display device of claim 1, wherein the light blocking cushion layer comprises a light blocking pigment and at least one of urethane acrylate, silicone, and epoxy.

3. The display device of claim 2, wherein the light blocking pigment comprises carbon.

4. The display device of claim 1, wherein a thickness of the light blocking cushion layer is equal to or more than about 50 micrometers and equal to or less than about 250 micrometers.

5. The display device of claim 1, wherein light absorption rate of the light blocking cushion layer is 99.9% or more.

6. The display device of claim 1, wherein the metal layer comprises copper.

7. The display device of claim 1, wherein a thickness of the metal layer is equal to or more than about 10 micrometers and equal to or less than about 50 micrometers.

8. The display device of claim 1, wherein the light blocking cushion layer comprises:

a light blocking layer disposed under the display panel, wherein the light blocking layer directly contacts the base substrate; and a cushion layer disposed under the light blocking layer, wherein the cushion layer directly contacts each of the light blocking layer and the metal layer.

9. The display device of claim 8, wherein a thickness of the light blocking layer is equal to or more than about 10 micrometers and equal to or less than about 30 micrometers.

10. A method of manufacturing a display device, comprising:

forming a display panel comprising a base substrate and a plurality of pixels disposed on the base substrate;

forming a light blocking cushion layer by applying a resin comprising an elastic polymer and a light blocking pigment on a lower surface of the base substrate; and forming a metal layer by coating metal particles on a lower surface of the light blocking cushion layer, wherein adhesive layer does not exist between the base substrate and the light blocking cushion layer, and between the light blocking cushion layer and the metal layer.

11. The method of claim 10, wherein the forming of the light blocking cushion layer comprises:

curing the resin by applying heat of equal to or more than about 50 Celsius and equal to or less than about 80 Celsius.

12. The method of claim 10, wherein the forming of the light blocking cushion layer comprises:

curing the resin by irradiating the resin with ultraviolet (UV) light and then drying the resin naturally.

13. The method of claim 10, wherein the resin further comprises a curing agent.

14. The method of claim 10, wherein the forming of the metal layer comprises:

injecting a plasma gas comprising the metal particles toward the lower surface of the light blocking cushion layer.

15. The method of claim 10, wherein the forming of the metal layer comprises:

applying ink comprising the metal particles and a solvent on the lower surface of the light blocking cushion layer;

evaporating the solvent by applying heat of equal to or more than about 40 Celsius and equal to or less than about 80 Celsius to the ink; and sintering the metal particles by irradiating the ink with light.

16. A method of manufacturing a display device, comprising:

forming a display panel comprising a base substrate and a plurality of pixels disposed on the base substrate;

forming a light blocking layer by applying a first resin comprising a light blocking pigment on a lower surface of the base substrate;

forming a cushion layer by applying a second resin comprising an elastic polymer on a lower surface of the light blocking layer; and forming a metal layer by coating metal particles on a lower surface of the cushion layer, wherein adhesive layer does not exist between the base substrate and the light blocking cushion layer, and between the light blocking cushion layer and the metal layer.

17. The method of claim 16, wherein the forming of the light blocking layer further comprises:

curing the first resin by irradiating the first resin with UV light.

18. The method of claim 17, wherein a thickness of the light blocking layer is equal to or more than about 10 micrometers and equal to or less than about 30 micrometers.

19. The method of claim 16, wherein the forming of the metal layer comprises:

injecting a plasma gas comprising the metal particles toward the lower surface of the cushion layer.

20. The method of claim 16, wherein the forming of the metal layer comprises:

applying ink comprising the metal particles and a solvent on the lower surface of the cushion layer;

evaporating the solvent by applying heat of equal to or more than about 40 Celsius and equal to or less than about 80 Celsius to the ink; and sintering the metal particles by irradiating the ink with light.

\* \* \* \* \*